VIDEOTELEPHONE SYSTEM FOR PROVIDING A VISUAL DISPLAY OF CALL PROGRESS SIGNALS
Filed Aug. 31, 1967 2 Sheets-Sheet 1

INVENTOR
B. LITOFSKY
BY Donald M. Duft
ATTORNEY

March 24, 1970 B. LITOFSKY 3,502,812

VIDEOTELEPHONE SYSTEM FOR PROVIDING A VISUAL DISPLAY OF CALL PROGRESS SIGNALS

Filed Aug. 31, 1967 2 Sheets-Sheet 2

United States Patent Office 3,502,812

Patented Mar. 24, 1970

3,502,812
VIDEOTELEPHONE SYSTEM FOR PROVIDING A VISUAL DISPLAY OF CALL PROGRESS SIGNALS

Barry Litofsky, Matawan, N.J., assignor to Bell Telephone Laboratories, Incorporated, Murray Hill and Berkeley Heights, N.J., a corporation of New York Filed Aug. 31, 1967, Ser. No. 664,849
Int. Cl. H04m *11/06*
U.S. Cl. 179—2 7 Claims

ABSTRACT OF THE DISCLOSURE

During the time a deaf subscriber is establishing a call connection in a video telephone system the video circuits are connected to the audio circuits so that the various call progress signals or service tones can be detected and the outputs of the detectors applied to cause distinctive video rasters for each such service tone.

BACKGROUND OF THE INVENTION

This invention relates to a telephone system and in particular, to a video telephone system which transmits both audio and video signals between connected subscribers station. This invention further relates to a video telephone system which is adapted to display call progress signals on its picture tube screen for the benefit of deaf subscribers. Still more particularly, this invention relates to a video telephone system in which a distinctive video raster is displayed by the picture tube of a calling station set whenever a service tone such as dial, busy, ringing, is encountered during the establishment or attempted establishment of a call connection.

The recently developed video telephone systems can provide previously unobtainable communication services for deaf people since they enable connected subscribers to see as well as to converse with each other. Although telephones with amplifiers in the handset are sufficient for the majority of people having hearing difficulties, there are many people who suffer from a total loss of hearing and who cannot rely upon amplifiers and the like to overcome their impairments. These people are now able to communicate over video telephone systems by lip reading or by the use of hand signals.

Although totally deaf subscribers can communicate by means of video telephone systems, they nevertheless still often require assistance and the help of others in the establishment of their calls. The reason for this is that the presently available video telephone systems contain no facilities for providing deaf subscribers with various call progress signals, i.e., dial tone, busy tone, ringing tone, etc. Just as these signals are necessary in conventional (audio only) telephone systems, they are also required in the video type systems so that calling subscribers may be kept informed as to the status of their calls and the current ability of the system to complete their connections. Since these signals are currently presented as audible tones in the video systems, deaf subscribers have no way of determining when a dial tone is first applied to their line so that they will not commence dialing prematurely; they have no way of determining when a call should be retried as a consequence of receiving an all circuits busy or a station busy tone; and they have no way of determining when a connection to the called line is completed and ringing tone is applied. As a consequence, they require assistance in completing their calls even though they can communicate with other subscribers after their connections are established.

It is an object of the invention to provide a video telephone system in which visible call progress indications are provided at calling stations.

It is a further object to provide a video telephone system in which the visible call progress indications are presented as rasters on the picture tube screen.

It is a further object to provide a raster unique to each type of tone that may be encountered by a calling station.

SUMMARY OF THE INVENTION

In accordance with my invention, I provide equipment in the station set of each deaf video telephone subscriber to enable its picture tube to display vertical patterns, i.e., rasters identifying the status of each call connection attempted by the subscriber. The equipment provided in accordance with my invention includes a manually operable switch which, when depressed by a subscriber upon the initiation of a call, cross connects the audio and video signal channels of the station and thereby impresses on the video circuits a portion of any signals appearing on the audio channel. This signal applied to the video circuit, together with the signals generated by the sweep circuitry of the video equipment, generates a distinct and easily recognizable raster.

The equipment provided in accordance with my invention further includes a plurality of filters, detectors, and oscillators, each of which is individual to one of the different types of service tones that are commonly encountered by a calling station. These include but are not limited to dial tone, ringing tone, busy tone, all trunks busy, overflow, permanent signal, calling station receiver off-hook, etc. Each of these tones is comprised of a distinctive frequency or distinctive combinations of frequencies. Each filter has a bandpass characteristic which permits only the frequencies of its service tone to pass therethrough to the input of its detector. The output of each detector is connected to its associated oscillator. Each oscillator is normally in an OFF or quiescent state. With this arrangement, each application of a service tone to the audio channel of a calling line causes a portion of the service tone to pass through the contacts of a depressed key at the calling station, and, in turn, to pass through the filter to the input of the detector individual to the tone. The detector, in response to the reception of frequencies passed by the filter, generate a DC output potential which is applied to its oscillator. This potential causes the oscillator to turn on and generate an output signal having a frequency determined by the parameters of the oscillator circuit. The output signal generated by each oscillator is, in turn, applied to the same control element of the picture tube to which the video signal representing the transmitted picture is normally applied. In the same manner as is characteristic of television receivers, this element will be either the control grid or the cathode. The application of the oscillator output signal to the input of the picture tube causes a raster unique to the oscillator frequency to be displayed. The precise pattern comprising each raster depends upon the frequency of the service tone oscillator, as well as the frequency of the horizontal and vertical sweep oscillators of the station equipment. The resultant raster may comprise alternating black and white vertical bars if the frequency of the service tone oscillator is equal to or comprises multiples of the horizontal sweep oscillator frequency. Alternatively, the raster may comprise alternating black and white horizontal bars if the service tone oscillator frequency is a submultiple of the horizontal sweep frequency. Since the frequency of each service tone oscillator is controlled exclusively by its own circuit parameters, and is not dependent on the frequency of the service tone with which it is associated, each oscillator may be chosen to be of a frequency which generates a unique, distinctive, and easily recognizable raster whenever its service tone is encountered during the initiation of a call. My invention thus enables a deaf subscriber to be kept advised as to the status of all calls initiated by him by observing the details of the raster produced on his picture tube screen each time a service tone is encountered.

A feature of my invention is the provision of equipment in a video telephone station set which generates a unique and distinctive raster on the picture tube screen whenever a service tone is encountered in connection with calls originated at the station set.

A further feature is the provision of equipment which upon the application of each service tone to its station set, applies to the signal input of its picture tube a signal having a frequency individual to the service tone.

A further feature is the provision of an oscillator individual to each type of service tone that may be encountered together with apparatus responsive to each reception of a service tone for activating the oscillator individual thereto so that a raster unique to the oscillator frequency is displayed by the picture tube.

A further feature is the provision of a filter and a detector individual to each service tone with the output of the detector being connected to the oscillator to actuate it in response to each application of its service tone to the input of the filter individual to the tone.

DESCRIPTION OF THE DRAWING

These and other objects and features of my invention will become more apparent upon a reading of the following description thereof taken in conjunction with the drawing in which FIG. 1 diagrammatically illustrates the apparatus I provide in a video telephone subset.

DETAILED DESCRIPTION

Figure 1:
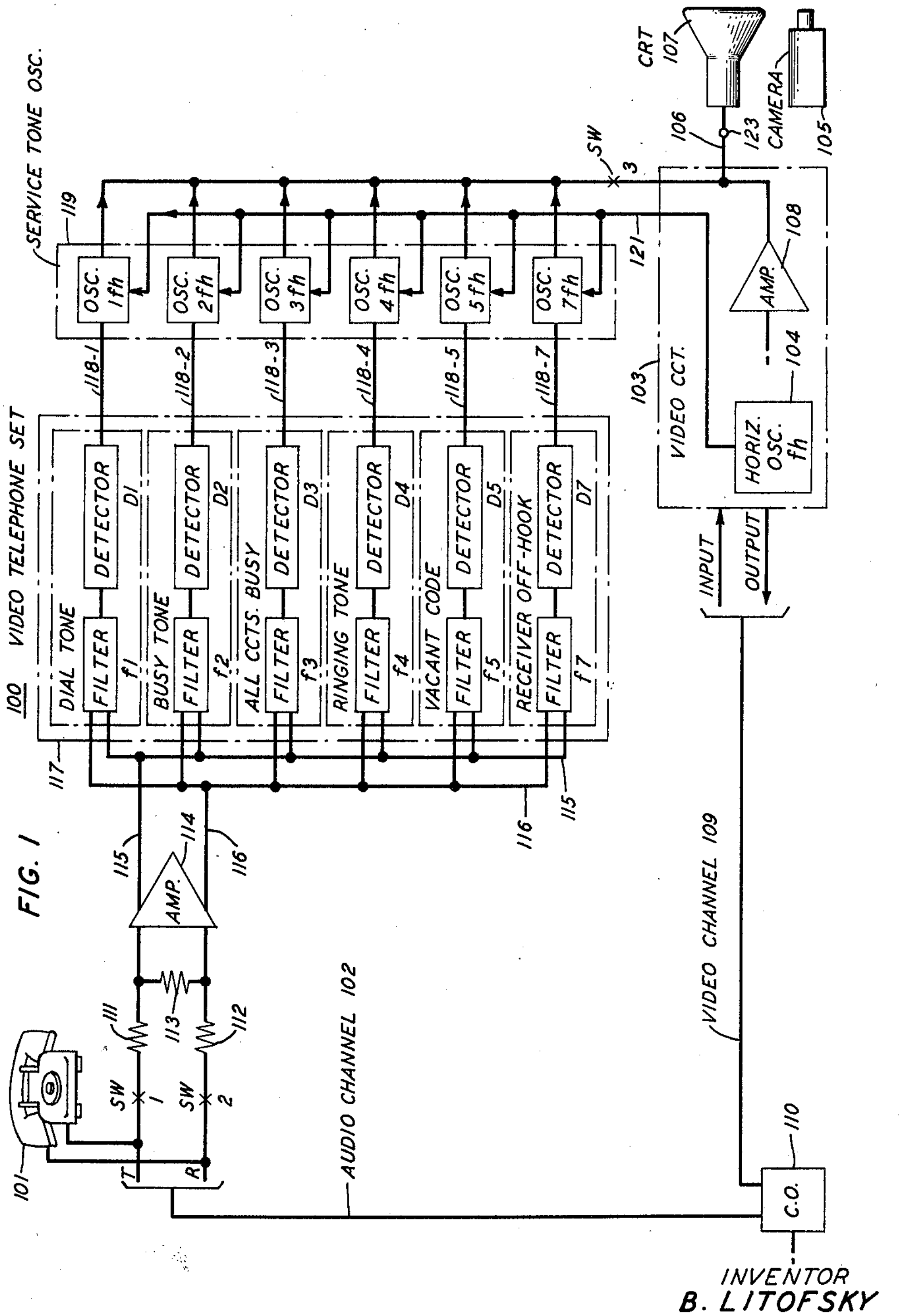

FIG. 1 discloses a video telephone system embodying my invention. Shown thereon is a central office 110 and a video telephone station set 100. Station set 100 includes an audio subset 101 connected by audio channel 102 to the central office 110. The station set 100 also includes a picture tube 107, a camera 105 and video circuits which are represented by rectangle 103 and which specifically comprises the horizontal oscillator 104 and video amplifier 108. The video circuits 103 are connected by means of the indicated input and output conductors via video channel 109 to the central office. The video circuits 103 are shown only diagrammatically and are understood to include all of the equipment required to receive video input signals from channel 109, to process them, and to apply them via conductor 106 to the picture tube 107. Circuitry 103 also contains all the equipment required to receive signals from camera 105 process them, and apply them via the indicated output conductors and video channel 109 to the central office.

The audio subset 101 together with audio 102 channel provides the typical facilities by means of which speech signals at set 100 may be interchanged with other subscriber stations. Similarly, the video circuits 103, together with the picture tube 107 and camera 105, provide the typical facilities by means of which video signals may be exchanged via channel 109 and central office 110 with other video telephone stations.

In acocrdance with my invention, the video telephone set 100 is equipped with the apparatus shown on FIG. 1 which enables the signals appearing on audio channel 102 to be applied to the video circuitry 103 under control of a calling subscriber. This equipment includes a switch SW having contacts 1, 2, and 3. Contacts 1 and 2 are connected to the T and R conductors of the audio channel and when the switch is operated by a calling subscriber, these contacts close and apply the signals appearing on the audio channel to the input of amplifier 114 via resistors 111, 112 and 113. The output conductors 115 and 116 of the amplifier are connected to the input of a plurality of the filters 117. Each filter is individual to one of the service tones that may be applied by office 110 to audio channel 102. The filters are individually designated *f1* through *f5* and *f7*, and each filter is designed to pass the frequency or band of frequencies comprising its associated service tone. The function of the service tone individual to each filter is indicated by the lettering within each of the separate rectangles 117. For example, filter *f1* passes the dial tone frequency. The output of each filter is individually connected to the input of a corresponding one of detecotrs D1 through D5 and D7. Each filter is operative in response to the application of its associate service tone to its input to pass the frequencies comprising the tone and apply them to the input of its detector which, in turn, generates and applies a D-C control potential to its associated output conductor in the group 118–1 through 118–7. Each of these output conductors is in turn connected to the input of an individual one of the service tone oscillators 119. The service tone oscillators 119 are designated 1*f*H through 5*f*H and 7*f*H to indicate the relationship between frequency of each oscillator 119 and that of the horizontal oscillator 104 whose frequency is *f*H. Thus, the frequency of oscillator 1*f*H is the same as that of the horizontal oscillator 104. The frequency of oscillator 2*f*H is twice that of the horizontal oscillator, the frequency of oscillator 7*f*H is seven times that of the horizontal oscillator. Each service tone oscillator 119 is normally in an OFF or quiescent state at which time it generates no output signal. The application of a D-C control potential by a detector to its output conductor 118– turns ON its associated oscillator which, in turn, applies its output to conductor 122. The conductor 121 interconnects the output of the horizontal oscillator 104 with each of the oscillators 119 so that the frequency generated by each one is an exact multiple of the frequency of oscillator 104.

The closed make contacts 3 of switch SW interconnect conductor 122 with conductor 106 which extends to the signal input of the picture tube 107. This interconnection applies the output of the activated service tone oscillator 119 to the signal input 123 of the picture tube. As subsequently described, this causes the display of a raster whose details are dependent upon the horizontal sweep frequency and that of the activated service tone oscillator.

Figure 2:
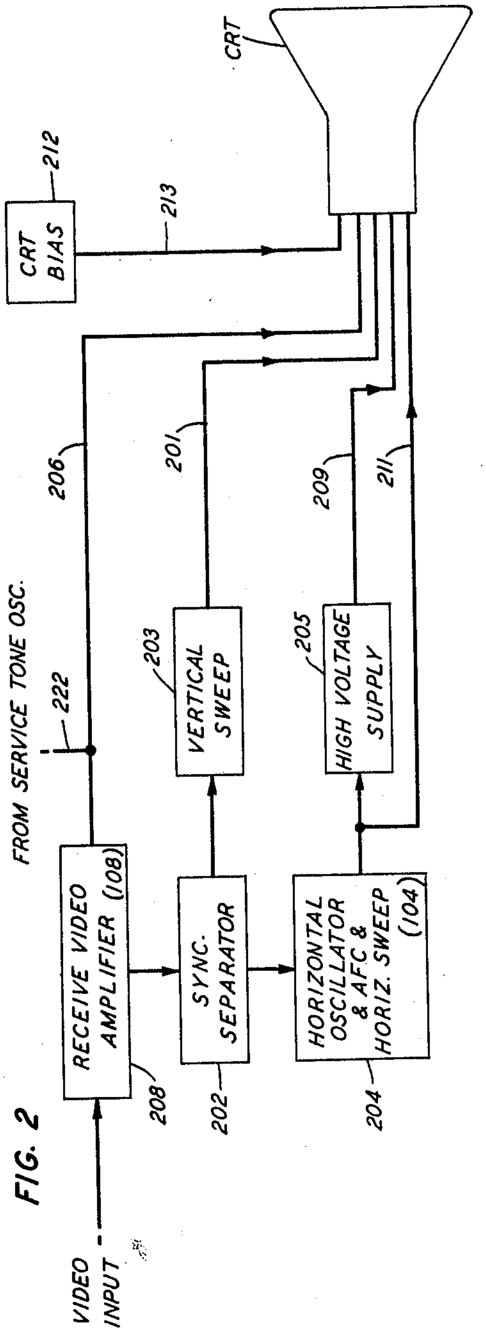
FIG. 2 discloses further details of a video telephone subset.

FIG. 2 discloses in greater detail the signal processing and deflection circuitry of the video telephone set. The video input information received from channel 109 is applied to the video amplifier 208 (which corresponds to amplifier 108 on FIG. 1) whose output is connected by means of conductor 206 to the signal input of the picture tube. Another output of the video amplifier is applied to the input of the sync separator 202 which separates the sync information into its horizontal and vertical components. The vertical sync is applied to the input of the vertical sweep circuitry 203 which, in a well-known manner, generates a vertical sweep signal and applies it over conductor 201 to the vertical input of the picture tube. In a similar manner, the horizontal component of the sync signal is applied to the input of the horizontal oscillator 204 (which corresponds to oscillator 104 on FIG. 1), AFC, and horizontal sweep circuitry whose output is connected over conductor 211 to the horizontal sweep portion of the picture tube and to the input of the high voltage supply 205. The output of the high voltage supply is connected over conductor 209 to the picture tube and the output of the bias supply 212 is connected over conductor 213 to bias the tube in the desired manner. The outputs of service tone oscillators shown on FIG. 1 are applied via conductor 222 (which corresponds to conductor 122 on FIG. 1) to conductor 206 (106 on FIG. 1) and, in turn, the signal input of the picture tube.

Each appearance of a service tone oscillator output on the input of the picture tube causes the production of a raster comprising alternating dark and light bars. The number of bars comprising each raster is dependent upon the relationship between the frequency of the service tone oscillator output and that of the frequency generated by the horizontal sweep oscillator. Since the output of each service tone oscillator is of a unique and distinctive frequency, the number of bars comprising the resultant raster produced by each such oscillator is distinct from that produced by any other oscillator. This permits a deaf subscriber to ascertain the presence and identity of an applied service tone by observing the pattern of the raster it produces.

Figures 3, 4, 5, 6, 7, 8:
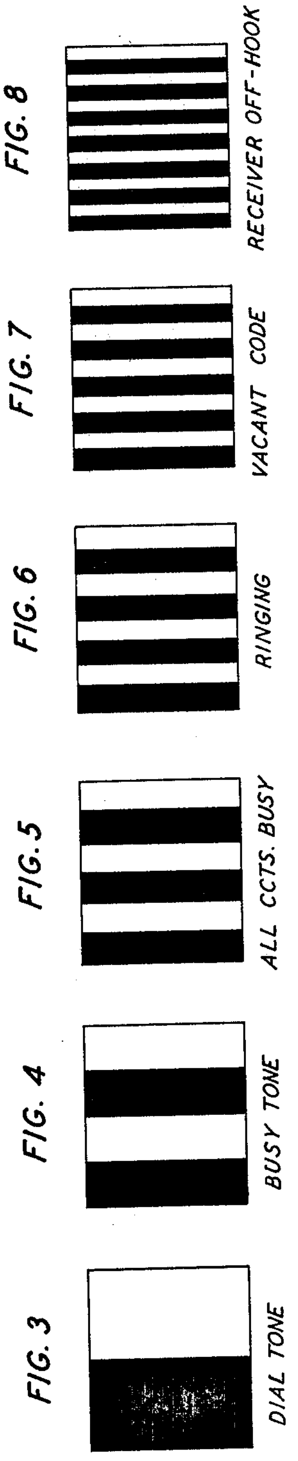
FIGS. 3 through 8 illustrate the rasters that may be displayed for the various types of service tones that may be typically encountered.

FIGS. 3 through 8 illustrate the raster that might typically be generated by service tone oscillators having the indicated frequencies shown on FIG. 1. For example, oscillator 1$f$H, which is associated with the dial tone, is of the same frequency as the horizontal oscillator 104 and its application to the signal input of the picture tube would produce a raster having one dark bar and one light bar as shown in FIG. 3. Oscillator 2$f$H has an output frequency that is twice that of the horizontal oscillator and its application to the input of the picture tube would produce the four bar raster type shown in FIG. 4. Oscillator 3$f$H is associated with an all circuits busy tone, its frequency is three times that of the horizontal oscillator, and its raster would comprise the six alternating black and white bars shown in FIG. 5. In a similar manner, oscillators 4$f$H, 5$f$H, and 7$f$H are respectively associated with ringing tone, vacant code tone, and a receiver offhook tone and each would generate the rasters shown in FIGS. 6, 7, and 8, respectively.

A calling subscriber would initially encounter the dial tone and the application of the dial tone to the calling line would actuate oscillator 1$f$H and produce the raster shown in FIG. 3. Following the dialing operation, and assuming the called line is idle, the return of ringing tone to the calling line would actuate oscillator 4$f$H which would produce the raster shown on FIG. 6. The raster would terminate when the called station answers and interrupts the ringing supply. Alternatively, if the called station did not answer, the raster shown in FIG. 6 would remain until the calling party abandons the call. If the called station is busy at the time a call is attempted, the busy tone would be returned to the calling line and the raster shown in FIG. 4 would be produced. In a similar manner, the rasters shown in FIGS. 5, 7 and 8 would be produced in response to an all circuits busy condition, the dialing of a vacant code, or the encountering of a receiver offhook signal at the calling station.

It may be appreciated from the foregoing that the rasters produced in accordance with my invention provide facilities by means of which a deaf subscriber may, without assistance, complete or attempt to complete call connections in the same manner as subscribers who do not have hearing impediments. The raster produced on the picture tube screen as each service tone is encountered provides a deaf subscriber with the same call status information that is provided to subscribers having normal hearing capabilities when the tone is applied to audio subset 101.

It is to be understood that the rasters shown on FIGS. 3 through 8 are merely exemplary and that other types of rasters could be produced in accordance with my invention. Thus, the rasters of FIGS. 3 through 8 differ from each other only by the number of vertical bars each contains. If other types of rasters are desired, certain of the oscillators 119 may be arranged to generate frequencies that are submultiples rather than multiples of the horizontal sweep frequency $f$H. The resultant raster produced by each such oscillator whose frequency is a submultiple would contain horizontal rather than vertical bars. Alternatively, certain of the service tone oscillators could be arranged to generate frequencies that are multiples of the horizontal sweep frequency while others could be arranged to generate frequencies that are submultiples. Such an arrangement would generate rasters containing either vertical or horizontal bars depending upon whether the oscillator associated with each raster generates a signal that is a multiple or a submultiple of the horizontal sweep signal. Such an arrangement might permit the various service tones shown to be identified with greater ease than the rasters containing only vertical bars as shown on FIGS. 3 through 8.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. In a video telephone system, a signal path for exchanging audio and video information between connected subscriber stations, each of said stations having an audio and a video signal channel, means for applying signals representing different types of service tones to the audio channel of a calling station during the establishment of a call connection therefrom, means for applying each of said tones received by said audio channel to the video channel of said calling station, and means responsive to each reception of any one of said tones by said video channel for displaying a distinctive raster identifying the type of tone.

2. The system of claim 1 in which said means for applying said tones to said video channel comprises, a manually controllable switch which may be operated to interconnect the audio channel of a calling station with its video channel.

3. The system of claim 2 in which said means responsive for displaying comprises, a picture tube at the calling station and means for applying to the signal input of said picture tube the tones received by said video channel.

4. The system of claim 3 in which said responsive means further comprises, a filter and a detector individual to each of said tyyes of tones with each filter being responsive to the application of its tone to said audio channel to pass the signal frequencies comprising its tone to the input of its detector, a normally OFF oscillator individual to each of said tones with each oscillator having a unique frequency of oscillation, each of said detectors being effective in response to the reception of its associated tone to turn ON the oscillator unique to its tone, means for applying an output signal of each oscillator in an ON state to the input of said picture tube, said picture tube being responsive to the reception of an oscillator output signal to display a raster unique to the oscillator and to the received tone to which the oscillator currently in an ON state is individual.

5. In a video telephone system having a plurality of subscriber stations each of which comprises: an audio and a video channel and a picture tube, signal detector means for detecting different types of service tones received by the audio channel of a calling station during the establishment of a call connection therefrom, means for applying to said detector means each service tone received by said audio channel, and means responsive to the reception of each of said tones by said detector means for causing said picture tube to display a distinctive raster identifying the type of service tone being received.

6. In a video telephone system, the combination in accordance with claim 5 wherein said means for causing said distinctive raster includes oscillator means unique to each of said types of tones, each of said oscillator means having a unique frequency of oscillation.

7. In a video telephone system equipped to exchange video and audio signals between subscriber stations, a picture tube at each of said stations; apparatus for detecting and identifying any of a plurality of service tones that may be received by a calling one of said stations during the establishment of the call connection therefrom, and apparatus at said calling station responsive to the reception of a service tone for presenting on its picture tube a pattern uniquely identifying the received tone.

No references cited.

KATHLEEN H. CLAFFY, Primary Examiner
THOMAS W. BROWN, Assistant Examiner

U.S. Cl. X.R.

179—81